(12) United States Patent
Jung et al.

(10) Patent No.: US 10,250,791 B2
(45) Date of Patent: Apr. 2, 2019

(54) MOBILE-BASED PERSONAL CONTENT PROTECTION APPARATUS AND METHOD THEREOF

(71) Applicant: Electronics and Telecommunications Research Institute, Daejeon (KR)

(72) Inventors: Sung Uk Jung, Daejeon (KR); Hyung Keun Jee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 111 days.

(21) Appl. No.: 15/452,882

(22) Filed: Mar. 8, 2017

(65) Prior Publication Data

US 2018/0167564 A1  Jun. 14, 2018

(30) Foreign Application Priority Data

Dec. 9, 2016 (KR) .......................... 10-2016-0167878

(51) Int. Cl.
*G06K 9/00* (2006.01)
*G06K 9/22* (2006.01)
(Continued)

(52) U.S. Cl.
CPC ......... *H04N 5/232* (2013.01); *G06F 21/6209* (2013.01); *G06K 9/00771* (2013.01);
(Continued)

(58) Field of Classification Search
CPC ........ H04N 5/232; H04W 4/02; H04W 8/005; G06F 21/6209; H04M 1/72577; H04M 2250/52; H04M 1/72572; G06T 7/70
See application file for complete search history.

(56) References Cited

U.S. PATENT DOCUMENTS 6,744,461 B1 * 6/2004 Wada ....................... H04N 7/18
  348/143
2006/0187237 A1 * 8/2006 Park ................. G08B 13/19686
  345/625

(Continued)

FOREIGN PATENT DOCUMENTS

KR  10-2009-0061814  6/2009
KR  10-2013-0101628  9/2013

*Primary Examiner* — Timothy J Henn
(74) *Attorney, Agent, or Firm* — Kile Park Reed & Houtteman PLLC

(57) ABSTRACT

Provided are a mobile-based personal content protection apparatus and method, in which a user sets a mobile terminal to prevent another user from photographing and using personal content with a camera included in the mobile terminal. The mobile-based personal content protection apparatus may include a camera view estimator, a peripheral information receiver, a personal content detector, and a personal content masking unit. A view which is to be photographed by a user is estimated in a space where photographing is allowed by using sensor information included in a mobile terminal, information about whether to allow photographing by each mobile device is collected by cooperating all mobile terminals in a camera view, and a disallowed area is masked in photographing, thereby fundamentally protecting personal content.

8 Claims, 6 Drawing Sheets

(51) Int. Cl.
*H04W 4/02* (2018.01)
*H04W 8/00* (2009.01)
*G06F 21/62* (2013.01)
*G06T 11/00* (2006.01)
*H04M 1/725* (2006.01)
*H04N 5/232* (2006.01)

(52) U.S. Cl.
CPC ............... *G06K 9/22* (2013.01); *G06T 11/00* (2013.01); *H04M 1/72577* (2013.01); *H04N 5/23206* (2013.01); *H04N 5/23229* (2013.01); *H04W 4/02* (2013.01); *H04W 8/005* (2013.01); *G06F 2221/2141* (2013.01); *H04M 1/72572* (2013.01); *H04M 2250/52* (2013.01)

(56) References Cited

U.S. PATENT DOCUMENTS

| | | | |
|---|---|---|---|
| 2006/0192853 A1* | 8/2006 | Lee | G06T 3/00 348/143 |
| 2008/0037875 A1 | 2/2008 | Kim et al. | |
| 2012/0140597 A1 | 6/2012 | Park et al. | |
| 2013/0219507 A1 | 8/2013 | Chang et al. | |
| 2016/0150188 A1* | 5/2016 | Ha | G06T 7/20 348/143 |
| 2016/0155465 A1* | 6/2016 | Park | G11B 20/005 386/241 |
| 2016/0350599 A1* | 12/2016 | Bataller | G06T 7/80 |
| 2017/0337652 A1* | 11/2017 | Sarin | G06Q 50/265 |

\* cited by examiner

MOBILE-BASED PERSONAL CONTENT PROTECTION APPARATUS AND METHOD THEREOF

CROSS-REFERENCE TO RELATED APPLICATIONS

This application claims priority under 35 U.S.C. § 119 to Korean Patent Application No. 10-2016-0167878, filed on Dec. 9, 2016, the disclosure of which is incorporated herein by reference in its entirety.

TECHNICAL FIELD

The present invention relates to a mobile-based personal content protection apparatus and method, and more particularly, to a mobile-based personal content protection apparatus and method, in which a user sets a mobile terminal to prevent another user from photographing and using personal content with a camera included in the mobile terminal.

BACKGROUND

In the related art, a method of identifying and selectively masking a person and a vehicle in a video to protect personal content is mainly used for protecting image-based personal content.

The method is applied to documents, services, and/or the like which are publicly used, and a method of passively analyzing an image to individually mask personal content is used.

There are a method of detecting a form of a person in an input image to mask a face or detect, mask a registration number of a vehicle and a method of analyzing and automatically masking an image, etc. However, in such technology, performance is limited depending on an image resolution or a detection algorithm, and a problem of portrait rights and personal content in a mobile device used by a person occurs.

The related art personal content protection method obtains a personal image and personal information and autonomously filters and processes the image in a web or a server. In such a method, however, since images are checked one by one, very much time is expended, and physical consumption is large. Also, since the method are mainly used by users, accuracy is reduced.

SUMMARY

Accordingly, the present invention provides a mobile-based personal content protection apparatus and method, in which a view which is to be photographed by a user is estimated in a space where photographing is allowed by using sensor information included in a mobile terminal, information about whether to allow photographing by each mobile device is collected by cooperating all mobile terminals in a camera view, and a disallowed area is masked in photographing, thereby fundamentally protecting personal content.

In one general aspect, a mobile-based personal content protection apparatus includes: a camera view estimator configured to, by using a sensor equipped in a mobile terminal of a user, calculate a position of the mobile terminal and a position of an area, which is being photographed by the camera included in the mobile terminal, to estimate a camera view; a peripheral information receiver configured to search for a mobile terminal located in an area within a predetermined range, based on the position of the mobile terminal and the camera view and receive peripheral position information and information about allowance of photographing from the found mobile terminal; a personal content detector configured to detect a personal content area based on an image captured by a camera included in a mobile terminal where the photographing is not allowed, based on the peripheral position information; and a personal content masking unit configured to mask the detected personal content area.

Other features and aspects will be apparent from the following detailed description, the drawings, and the claims.

DETAILED DESCRIPTION OF EMBODIMENTS

Hereinafter, embodiments of the present invention will be described in detail to be easily embodied by those skilled in the art with reference to the accompanying drawings. The present invention may, however, be embodied in many different forms and should not be construed as being limited to the embodiments set forth herein. The present invention may, however, be embodied in many different forms and should not be construed as being limited to the embodiments set forth herein. In the accompanying drawings, a portion irrelevant to a description of the present invention will be omitted for clarity.

In this disclosure below, when it is described that one comprises (or includes or has) some elements, it should be understood that it may comprise (or include or has) only those elements, or it may comprise (or include or have) other elements as well as those elements if there is no specific limitation.

Hereinafter, a mobile-based personal content protection apparatus and method according to an embodiment of the present invention will be described in detail with reference to the accompanying drawings.

Figure 1:
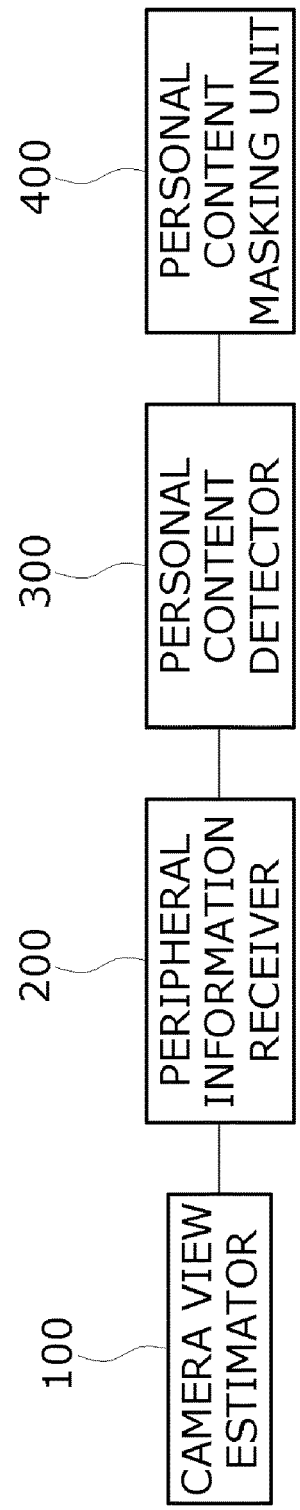
FIG. 1 is a block diagram illustrating a configuration of a mobile-based personal content protection apparatus according to an embodiment of the present invention.

FIG. 1 is a block diagram illustrating a configuration of a mobile-based personal content protection apparatus 1000 according to an embodiment of the present invention.

Referring to FIG. 1, the mobile-based personal content protection apparatus 1000 may include a camera view estimator 100, a peripheral information receiver 200, a personal content detector 300, and a personal content masking unit 400.

For reference, the elements according to an embodiment of the present invention illustrated in FIG. 1 may each be implemented in the form of software or in the form of hardware such as a field programmable gate array (FPGA) or an application specific integrated circuit (ASIC) and may perform certain functions.

However, the elements are not limited to software or hardware in meaning. In other embodiments, each of the elements may be configured to be stored in a storage medium capable of being addressed, or may be configured to execute one or more processors.

Therefore, for example, the elements may include elements such as software elements, object-oriented software elements, class elements, and task elements, processes, functions, attributes, procedures, subroutines, segments of a program code, drivers, firmware, microcode, circuits, data, databases, data structures, tables, arrays, and variables.

Elements and a function provided in corresponding elements may be combined into fewer elements or may be further divided into additional elements.

By using a sensor equipped in a mobile terminal of a user, the camera view estimator 100 may calculate a position of the mobile terminal and a position of an area which is being photographed by the camera included in the mobile terminal, thereby estimating a camera view.

According to an embodiment of the present invention, examples of the sensor equipped in the mobile terminal of the user may include a global positioning system (GPS) sensor, a gyro sensor, an acceleration sensor, and a compass sensor.

According to the present embodiment, when the position of the mobile terminal is an indoor place, the camera view estimator 100 may collect Wi-Fi information, information sensed by the compass sensor, and information sensed by the gyro sensor to estimate the camera view. Also, when the position of the mobile terminal is an outdoor place, the camera view estimator 100 may collect information sensed by the GPS sensor, the information sensed by the compass sensor, and the information sensed by the gyro sensor to estimate the camera view.

According to an embodiment of the present invention, a camera view may be re-estimated by applying a geographic information map to the estimated camera view.

The peripheral information receiver 200 may search for a mobile terminal located in an area within a predetermined range, based on the position of the mobile terminal and the camera view and may receive peripheral position information and information about allowance of photographing from the found mobile terminal.

According to an embodiment of the present invention, when a mobile terminal is located at an indoor place, the peripheral information receiver 200 may collect information about allowance or disallowance of photographing by the mobile terminal, and based on the collected information, the peripheral information receiver 200 may prohibit photographing by a camera included in a mobile terminal which is not allowed.

Moreover, according to an embodiment of the present invention, when a mobile terminal is located in an outdoor place, the peripheral information receiver 200 may collect information about allowance or disallowance of the mobile terminal located in an area within a predetermined range.

According to an embodiment of the present invention, information about allowance or disallowance of photographing may include a photographing allowance setting value for a mobile terminal located in an area within a predetermined range.

Here, the photographing allowance setting value may denote a setting value having one value of agreement "YES" and disagreement "NO" on allowance of photographing. If the setting value is agreement "YES", it may be considered that photographing is allowed, and if the setting value is disagreement "NO", it may be considered that photographing is not allowed.

According to an embodiment of the present invention, a setting for allowing photographing of personal content by a mobile terminal may be determined through firmware and application software of the mobile terminal.

According to an embodiment of the present invention, when photographing is not allowed, an image processing module may block a display output of a mobile terminal in an image capturing process performed by a camera, thereby blocking user access.

The personal content detector 300 may detect a personal content area based on an image captured by a camera included in a mobile terminal where photographing is not allowed, based on peripheral position information.

Here, the personal content area may denote an area which includes an object constituting personal content to protect, and may denote an area which is to be masked in a masking process.

According to an embodiment of the present invention, detection of a position and a size of a personal content area, which is to be masked based on an image captured by a camera included in a mobile terminal where photographing is not allowed, may be performed by the number of objects of all personal content list information.

Here, the all personal content list information may be information which includes the number, sizes, positions, and the like of personal content-related objects included in an image obtained by a method of analyzing an image captured by a camera included in a mobile terminal or a method of receiving an image from another mobile terminal over a network.

The personal content masking unit 400 may mask the detected personal content area.

According to an embodiment of the present invention, when a user desires to capture a peripheral image with a camera of a mobile terminal, the user may analyze sensor information of the camera to estimate an area of a camera view and may check a photographing allowance setting for the mobile terminal of the user located in the estimated area.

For example, a case where a user approves photographing of the user may be set as "YES", and a case where a user disapproves photographing of the user may be set as "NO". After information is collected, a user included in a camera view may be detected as a personal content area, and a user for the detected personal content area set as "NO" may estimate and mask an area.

According to an embodiment of the present invention, when a user desires to capture a peripheral image with a camera of a mobile terminal by using a vehicle recognition number filtering method, an area of a camera view may be calculated by analyzing sensor information of the camera, and a setting of a vehicle or a building (when Internet of things (IoT) is applied) located in the calculated area may be checked. When set as "NO", a position of an object may be estimated and may be detected as a personal content area, and the detected personal content area may be masked.

According to an embodiment of the present invention, when a user desires to capture an indoor image with a camera of a mobile terminal at an indoor place (for example, security facilities, military facilities, etc.), position information about the mobile terminal may be checked, and whether photographing of a corresponding building is allowed may be checked. When set as "NO", an operation of the camera included in the mobile terminal may be stopped in order for photographing not to be performed in the building, thereby prohibiting photographing by the camera.

According to an embodiment of the present invention, masking a personal content area is not limited to a specific embodiment, and a method of covering or deleting a personal content area to prevent exposure may be used without being limited.

According to an embodiment of the present invention, each personal content included in the detected personal content area may be masked based on information about each object in a peripheral personal content list.

According to an embodiment of the present invention, the mobile-based personal content protection apparatus 1000 may include a communication module (not shown), a memory (not shown), and a processor (not shown) and may operate the elements of FIG. 1.

The communication module may transceiver data with one or more mobile terminals. In this case, the communication module may include a wired communication module and a wireless communication module. The wired communication module may be implemented with a power line communication device, a telephone line communication device, a cable home (MoCA), Ethernet, IEEE1294, an integration wired home network, an RS-485 control device, and/or the like. Also, the wireless communication module may be implemented with WLAN, Bluetooth, HDR WPAN, UWB, Zigbee, impulse radio, 60 GHz WPAN, binary-CDMA, wireless USB technology, wireless HDMI technology, and/or the like.

The memory may store programs for respectively operating the elements and the processor may execute the programs. Here, the memory may be a generic name for a volatile memory and a nonvolatile memory that continuously maintains stored information even when power is supplied thereto.

For example, examples of the memory may include NAND flash memory such as a compact flash (CF) card, a secure digital (SD) card, a memory stick, a solid state driver (SSD), and a micro SD card, a magnetic computer memory device such as a hard disk drive (HDD), and an optical disk drive such a CD-ROM and a DVD-ROM.

Moreover, the programs stored in the memory may each be implemented in the form of software or in the form of hardware such as an FPGA or an ASIC and may perform certain functions.

Figure 2:
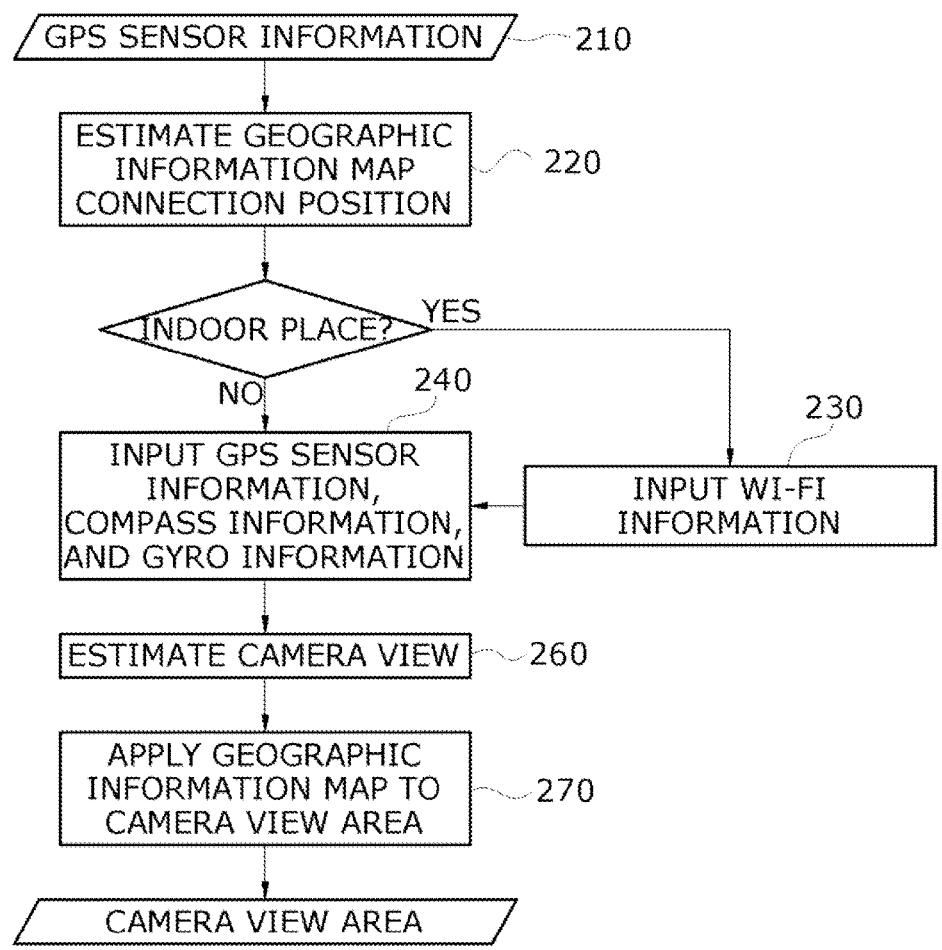
FIG. 2 is a flowchart illustrating data flow in a camera view estimating process according to an embodiment of the present invention.

FIG. 2 is a flowchart illustrating data flow in a camera view estimating process according to an embodiment of the present invention.

Referring to FIG. 2, the camera view estimating process according to an embodiment of the present invention will be described below.

First, in step 210, GPS information may be received from a mobile terminal of a user. In step 220, an approximate position of the mobile terminal may be estimated by using both the received GPS information and a geographic information map.

When the approximate position of the mobile terminal is an indoor place in step 230, a camera view may be estimated by using Wi-Fi information, compass sensor information, and gyro sensor information in step 240. Also, when the position of the mobile terminal is an outdoor place, the Wi-Fi information, the compass sensor information, and the gyro sensor information may be collected in step 250, and thus, the camera view may be estimated in step 260.

Finally, a camera view may be re-estimated by using the geographic information map in step 270.

Figure 3:
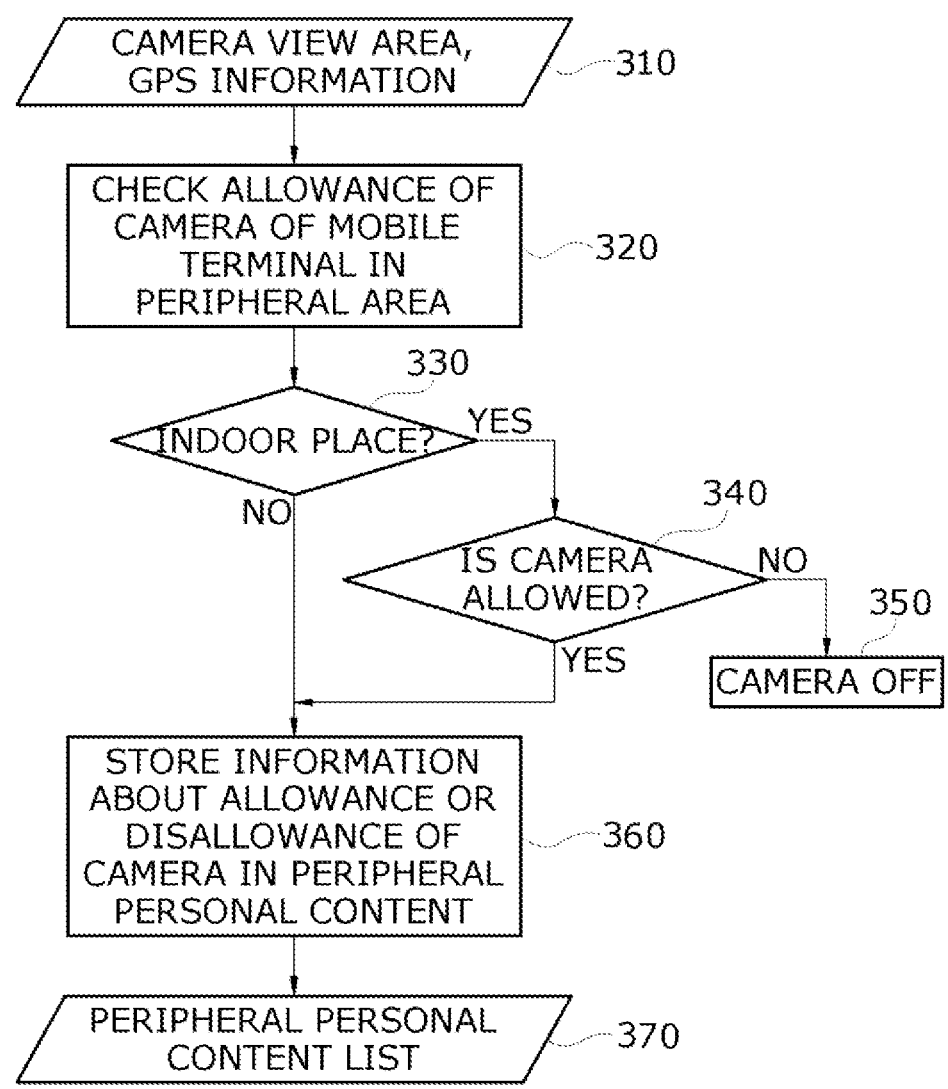
FIG. 3 is a flowchart illustrating data flow in a process of receiving peripheral position information and information about whether photographing is allowed, according to an embodiment of the present invention.

FIG. 3 is a flowchart illustrating data flow in a process of receiving peripheral position information and information about whether photographing is allowed, according to an embodiment of the present invention.

Referring to FIG. 3, the process of receiving peripheral position information and information about whether photographing is allowed, according to an embodiment of the present invention, will be described below.

By using the estimated camera view and the GPS information in step 310, whether photographing of a peripheral area by the camera included in the mobile terminal is allowed may be checked in step 320.

When the mobile terminal is located at an indoor place in step 330, whether the camera is allowed at the indoor place may be checked in step 340, and if the camera is not allowed, an operation of the camera may be stopped in step 350.

When the mobile terminal is located at an outdoor place in step 330, information about whether the photographing is allowed and peripheral position information from the mobile terminal may be stored in step 360, and a peripheral personal content list may be created in step 370.

Figure 4:
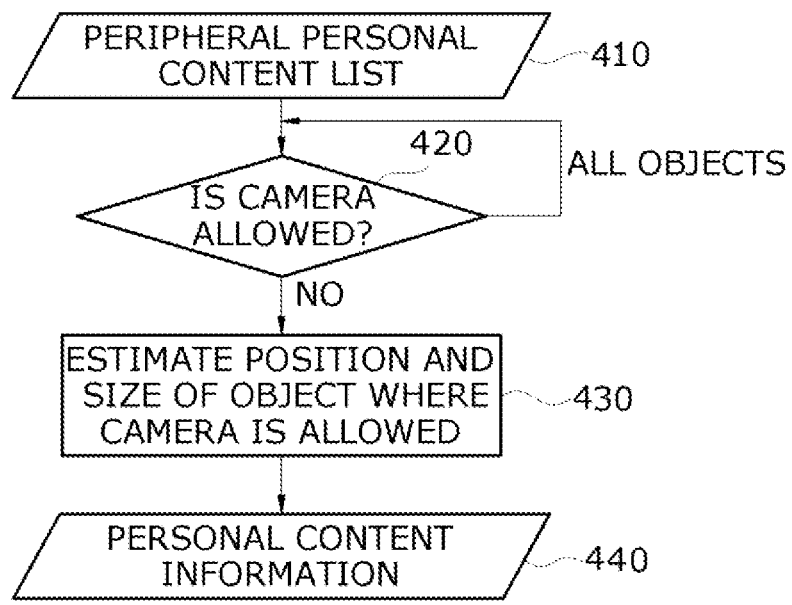
FIG. 4 is a flowchart illustrating data flow in a personal content area detecting process according to an embodiment of the present invention.

FIG. 4 is a flowchart illustrating data flow in a personal content area detecting process according to an embodiment of the present invention.

Referring to FIG. 4, the personal content area detecting process according to an embodiment of the present invention will be described below.

The peripheral personal content list may be received in step 410, and whether photographing is allowed in each personal content may be determined in step 420.

When the photographing is allowed, a next object may be searched, and when the photographing is not allowed, a position and a size of the personal content may be estimated in step 430.

According to an embodiment of the present invention, such an estimation process may be performed by the number of objects included in the personal content list in step 440.

Here, a method of estimating a position and a size of an object may detect a face or an area of a person by using a method such as a person detector of HOG or Violar when the object is a person and may store the area as a tetragonal area or store only an edge by using a segmentation method, but is not limited thereto.

According to an embodiment of the present invention, if an object is a vehicle, a vehicle detector may be used. In vehicles, since a registration number is important, a vehicle may be detected, and an area may be stored by using a registration number detector.

Moreover, in buildings and other personal content, a corresponding area may be stored by using GPS information and a geographic information map.

Figure 5:
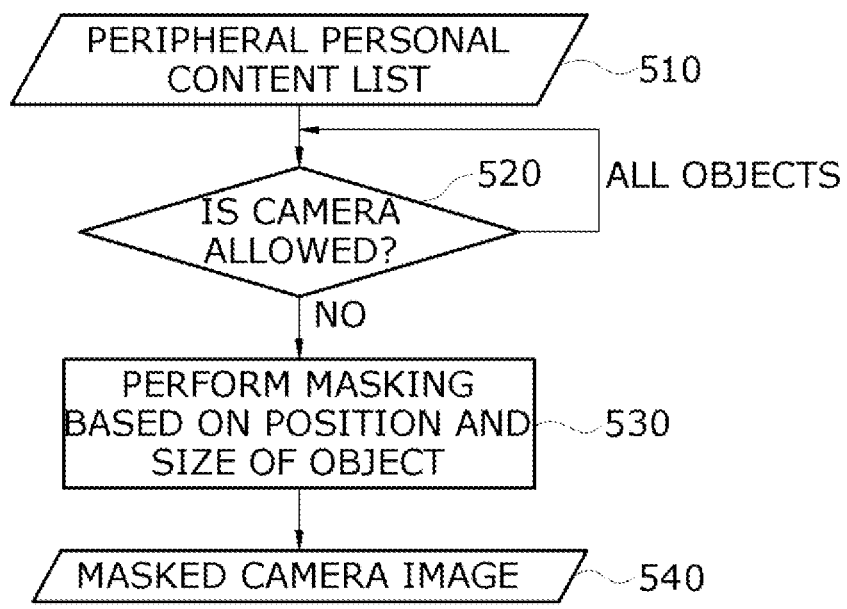
FIG. 5 is a flowchart illustrating data flow in a personal content area masking process according to an embodiment of the present invention.

FIG. 5 is a flowchart illustrating data flow in a personal content area masking process according to an embodiment of the present invention.

Referring to FIG. 5, the personal content area masking process according to an embodiment of the present invention will be described below.

The peripheral personal content list may be received in step 510, and whether photographing of each personal content area is allowed may be determined in step 520. When the photographing is allowed, a current personal content area may be changed to a next personal content area.

When the photographing is not allowed, an image may be masked based on a size and a position of an object included in a personal content area in step 530 to generate a masked image in step 540.

Figure 6:
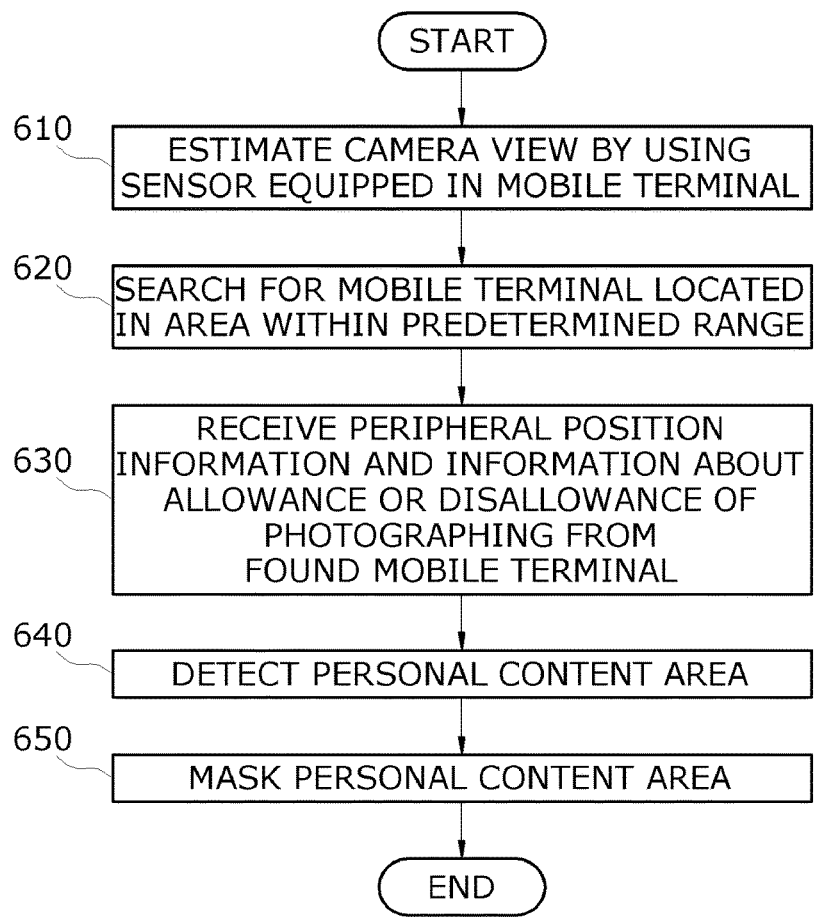
FIG. 6 is a flowchart illustrating a mobile-based personal content protection method according to an embodiment of the present invention.

FIG. 6 is a flowchart illustrating a mobile-based personal content protection method according to an embodiment of the present invention.

A camera view may be estimated by using a sensor equipped in a mobile terminal in step 610.

By using a sensor equipped in the mobile terminal of a user, the mobile-based personal content protection apparatus may calculate a position of the mobile terminal and a position of an area which is being photographed by the camera included in the mobile terminal, thereby estimating a camera view.

According to an embodiment of the present invention, examples of the sensor equipped in the mobile terminal of the user may include a GPS sensor, a gyro sensor, an acceleration sensor, and a compass sensor.

According to the present embodiment, when the position of the mobile terminal is an indoor place, the mobile-based personal content protection apparatus may collect Wi-Fi information, information sensed by the compass sensor, and information sensed by the gyro sensor to estimate the camera view. Also, when the position of the mobile terminal is an outdoor place, the mobile-based personal content protection apparatus may collect information sensed by the GPS sensor, the information sensed by the compass sensor, and the information sensed by the gyro sensor to estimate the camera view.

According to an embodiment of the present invention, a camera view may be re-estimated by applying a geographic information map to the estimated camera view.

Subsequently, in step 620, the mobile-based personal content protection apparatus may search for a mobile terminal located in an area within a predetermined range.

According to an embodiment of the present invention, the mobile-based personal content protection apparatus may search for a mobile terminal located in an area within a predetermined range, based on the position of the mobile terminal and the camera view.

Subsequently, in step 630, the mobile-based personal content protection apparatus may receive peripheral position information and information about allowance of photographing from the found mobile terminal.

According to an embodiment of the present invention, the peripheral position information and the information about allowance of photographing may be received from the found mobile terminal.

According to an embodiment of the present invention, when a mobile terminal is located at an indoor place, the mobile-based personal content protection apparatus may collect information about allowance or disallowance of photographing by the mobile terminal, and based on the collected information, the mobile-based personal content protection apparatus may prohibit photographing by a camera included in a mobile terminal which is not allowed.

Moreover, according to an embodiment of the present invention, when a mobile terminal is located in an outdoor place, the mobile-based personal content protection apparatus may collect information about allowance or disallowance of the mobile terminal located in an area within a predetermined range.

According to an embodiment of the present invention, information about allowance or disallowance of photographing may include a photographing allowance setting value for a mobile terminal located in an area within a predetermined range.

Here, the photographing allowance setting value may denote a setting value having one value of agreement "YES" and disagreement "NO" on allowance of photographing. If the setting value is agreement "YES", it may be considered that photographing is allowed, and if the setting value is disagreement "NO", it may be considered that photographing is not allowed.

According to an embodiment of the present invention, a setting for allowing photographing of personal content by a mobile terminal may be determined through firmware and application software of the mobile terminal.

According to an embodiment of the present invention, when photographing is not allowed, an image processing module may block a display output of a mobile terminal in an image capturing process performed by a camera, thereby blocking user access.

Subsequently, in step 640, a personal content area may be detected.

The mobile-based personal content protection apparatus may detect a personal content area based on an image captured by a camera included in a mobile terminal where photographing is not allowed, based on peripheral position information.

Here, the personal content area may denote an area which includes an object constituting personal content to protect, and may denote an area which is to be masked in a masking process.

According to an embodiment of the present invention, detection of a position and a size of a personal content area, which is to be masked based on an image captured by a camera included in a mobile terminal where photographing is not allowed, may be performed by the number of objects of all personal content list information.

Here, the all personal content list information may be information which includes the number, sizes, positions, and the like of personal content-related objects included in an image obtained by a method of analyzing an image captured by a camera included in a mobile terminal or a method of receiving an image from another mobile terminal over a network.

Subsequently, in step 650, the personal content area may be masked.

The mobile-based personal content protection apparatus may mask the detected personal content area.

According to an embodiment of the present invention, when a user desires to capture a peripheral image with a camera of a mobile terminal, the user may analyze sensor information of the camera to estimate an area of a camera view and may check a photographing allowance setting for the mobile terminal of the user located in the estimated area.

For example, a case where a user approves photographing of the user may be set as "YES", and a case where a user disapproves photographing of the user may be set as "NO". After information is collected, a user included in a camera view may be detected as a personal content area, and a user for the detected personal content area set as "NO" may estimate and mask an area.

According to an embodiment of the present invention, when a user desires to capture a peripheral image with a camera of a mobile terminal by using a vehicle recognition number filtering method, an area of a camera view may be calculated by analyzing sensor information of the camera, and a setting of a vehicle or a building (when Internet of things (IoT) is applied) located in the calculated area may be checked. When set as "NO", a position of an object may be estimated and may be detected as a personal content area, and the detected personal content area may be masked.

According to an embodiment of the present invention, when a user desires to capture an indoor image with a camera of a mobile terminal at an indoor place (for example, security facilities, military facilities, etc.), position information about the mobile terminal may be checked, and whether photographing of a corresponding building is allowed may be checked. When set as "NO", an operation of the camera included in the mobile terminal may be stopped in order for photographing not to be performed in the building, thereby prohibiting photographing by the camera.

According to an embodiment of the present invention, masking a personal content area is not limited to a specific embodiment, and a method of covering or deleting a personal content area to prevent exposure may be used without being limited.

According to an embodiment of the present invention, each personal content included in the detected personal content area may be masked based on information about each object in a peripheral personal content list.

Figure 7:
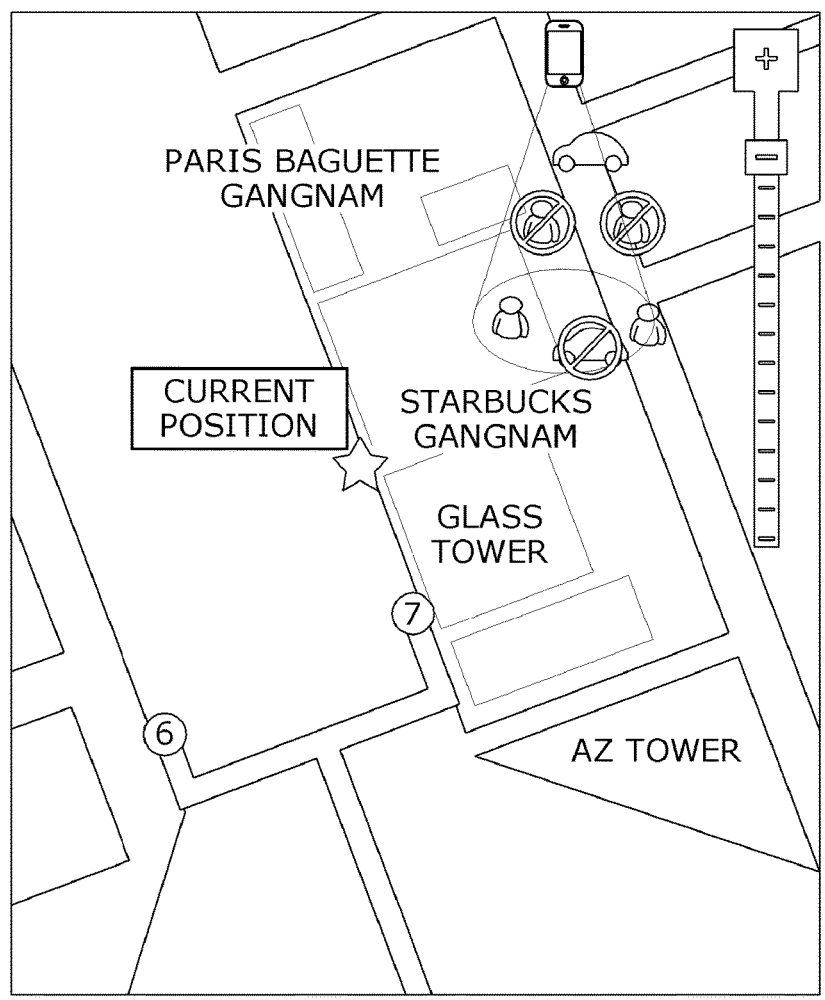
FIG. 7 is a diagram illustrating an example of a personal content protection method according to an embodiment of the present invention.

FIG. 7 is a diagram illustrating an example of a personal content protection method according to an embodiment of the present invention.

According to the embodiments of the present invention, by using a mobile terminal, collection of personal content is fundamentally prevented, and an image processing module of a camera may verify the personal content, thereby preventing circulation of the personal content.

Moreover, according to the embodiments of the present invention, a user may designate a setting value of a mobile terminal, and thus, photographing is fundamentally prevented at a place which photographing is not allowed. Therefore, a time/financial problem which occurs in a post-processing operation for protecting personal content is solved, and at a place which is high in security level like security facilities and military facilities, photographing is automatically prevented without checking a mobile device.

Meanwhile, the method according to an exemplary embodiment of the inventive concept may be implemented by a computer program stored in a medium which is executed by a computer, or in a form of a recording medium including an instruction which is executable by the computer. The computer readable medium may be any available medium which is accessible by the computer, and include volatile and non-volatile media, and removable and non-removable media. Further, the computer readable medium may include a computer storage medium and a communication medium. The computer storage medium may include volatile and non-volatile media and removable and non-removable media implemented by any method and technology of storing information such as a computer-readable instruction, a data structure, a program module, or other data. The communication medium may include other data or other transmission mechanisms of a modulated data signal such as a computer readable instruction, a data structure, a program module or a carrier wave, and include any information transmission medium.

While the method and the system of the inventive concept are described with reference to a specific exemplary embodiment, all or a portion of the components or the operations may be implemented by using a computer system having a general-purpose hardware architecture.

While the exemplary embodiments of the inventive concept are described in detail above, it will be understood by those of ordinary skill in the art that various changes and modifications in form and details may be made therein without departing from the spirit and scope as defined by the following claims. Therefore, it will be understood that the exemplary embodiments described above are merely examples in every aspect, and the inventive concept is not limited thereto. For example, each component described in a single type may be implemented in a distributed type, and similarly, components described in the distributed type may be implemented in a combined type.

The scope of the inventive concept should be defined by claims, and it is intended that the inventive concept covers all such modifications and changes by those of ordinary skill in the art derived from a basic concept of the appended claims, and their equivalents.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A mobile-based personal content protection apparatus comprising:
   a camera view estimator configured to, by using a sensor equipped in a mobile terminal of a user, calculate a position of the mobile terminal and a position of an area, which is being photographed by the camera included in the mobile terminal, to estimate a camera view;
   a peripheral information receiver configured to search for another mobile terminal located in an area within a predetermined range, based on the position of the another mobile terminal and the camera view and receive peripheral position information and information about allowance of photographing from the another mobile terminal;
   a personal content detector configured to detect a personal content area based on an image captured by a camera included in the another mobile terminal where the photographing is not allowed, based on the peripheral position information; and
   a personal content masking unit configured to mask the detected personal content area.

2. The mobile-based personal content protection apparatus of claim 1, wherein the camera view estimator uses a global positioning system (GPS) sensor, a gyro sensor, an acceleration sensor, and a compass sensor as the sensor equipped in the mobile terminal of the user.

3. The mobile-based personal content protection apparatus of claim 2, wherein
   when the position of the another mobile terminal is an indoor place, the camera view estimator collects Wi-Fi information, information sensed by the compass sensor, and information sensed by the gyro sensor to estimate the camera view, and
   when the position of the another mobile terminal is an outdoor place, the camera view estimator collects information sensed by the GPS sensor, the information sensed by the compass sensor, and the information sensed by the gyro sensor to estimate the camera view.

4. The mobile-based personal content protection apparatus of claim 1, wherein the camera view estimator reestimates a camera view by applying a geographic information map to the estimated camera view.

5. The mobile-based personal content protection apparatus of claim 1, wherein when the another mobile terminal is located at an indoor place, the peripheral information receiver collects information about allowance or disallowance of photographing by the another mobile terminal, and based on the collected information, the peripheral information receiver prohibits photographing by a camera included in the another mobile terminal which is not allowed, and when the another mobile terminal is located in an outdoor place, the peripheral information receiver collects information about allowance or disallowance of the another mobile terminal located in the area within the predetermined range.

6. The mobile-based personal content protection apparatus of claim 1, wherein in the peripheral information receiver, information about allowance or disallowance of the photographing comprises a photographing allowance setting value for the another mobile terminal located in the area within the predetermined range.

7. The mobile-based personal content protection apparatus of claim 1, wherein the personal content detector performs detection of a position and a size of a personal content area, which is to be masked based on the image captured by the camera included in the another mobile terminal where the photographing is not allowed, by number of objects of all personal content list information.

8. The mobile-based personal content protection apparatus of claim 1, wherein the personal content masking unit masks each of pieces of personal content included in the detected personal content area, based on information about each of objects in a peripheral personal content list.

* * * * *